(12) United States Patent  
Li

(10) Patent No.: US 8,896,762 B2  
(45) Date of Patent: Nov. 25, 2014

(54) METHOD AND APPARATUS FOR ACCESSING MULTIMEDIA RESOURCE OF SMART TELEVISION AND SMART TELEVISION

(71) Applicant: Huawei Technologies Co., Ltd., Shenzhen, Guangdong (CN)

(72) Inventor: Guozhu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/869,681

(22) Filed: Apr. 24, 2013

(65) Prior Publication Data

US 2013/0293786 A1  Nov. 7, 2013

(30) Foreign Application Priority Data

Apr. 27, 2012 (CN) .......................... 2012 1 0129005

(51) Int. Cl.  
*H04N 5/50* (2006.01)  
*H04N 21/81* (2011.01)  
*H04N 21/472* (2011.01)  
*H04N 21/482* (2011.01)

(52) U.S. Cl.  
CPC ............. *H04N 5/50* (2013.01); *H04N 21/8173* (2013.01); *H04N 21/472* (2013.01); *H04N 21/482* (2013.01)  
USPC .......................................... 348/731; 348/569

(58) Field of Classification Search  
CPC . H04N 21/482; H04N 21/462; H04N 21/478; H04N 21/26283; H04N 21/266; H04N 21/43; H04N 21/431; H04N 21/442; H04N 21/44222; H04N 21/47; H04N 21/4345; H04N 21/4383; H04N 21/4126; H04N 21/4823; H04N 5/50; H04N 5/44; H04N 5/46; H04N 5/4403  
USPC ......... 348/731, 732, 734, 553, 563, 569–570, 348/725–726; 725/38, 53, 56  
IPC ......................................................... H04N 5/50  
See application file for complete search history.

(56) References Cited

U.S. PATENT DOCUMENTS

| 7,092,044 | B2 * | 8/2006 | Inui et al. ...................... 348/732 |
| 8,130,327 | B2 * | 3/2012 | Han et al. ...................... 348/731 |
| 8,300,155 | B2 * | 10/2012 | Sakashita et al. ............. 348/732 |
| 8,508,670 | B2 * | 8/2013 | Dai et al. ...................... 348/734 |
| 2007/0157236 | A1 | 7/2007 | Kim |
| 2008/0235728 | A1 | 9/2008 | Kim |
| 2009/0195696 | A1 * | 8/2009 | McDaniel ...................... 348/570 |
| 2012/0019721 | A1 | 1/2012 | Choi et al. |

FOREIGN PATENT DOCUMENTS

| CN | 1780369 A | 5/2006 |
| CN | 1988615 A | 6/2007 |
| CN | 101272207 A | 9/2008 |

* cited by examiner

*Primary Examiner* — Trang U Tran

(57) ABSTRACT

A method for accessing a multimedia resource of a smart television, includes: receiving a channel selection signal to determine a target channel index number; querying pre-bound correspondence between a channel index number and a multimedia resource; when one multimedia resource corresponding to the target channel index number exists, starting the multimedia resource; and when multiple multimedia resources corresponding to the target channel index number exist, presenting all identifiers of the multimedia resources corresponding to the target index number, and determining a target multimedia resource according to a selection instruction of a user and starting the target multimedia resource, where the multimedia resource is a television channel or an application program.

10 Claims, 7 Drawing Sheets

METHOD AND APPARATUS FOR ACCESSING MULTIMEDIA RESOURCE OF SMART TELEVISION AND SMART TELEVISION

CROSS-REFERENCE TO RELATED APPLICATION

This application claims priority to Chinese Patent Application No. 201210129005.5, filed on Apr. 27, 2012, which is hereby incorporated by reference in its entirety.

TECHNICAL FIELD

The present invention relates to the field of smart television technologies, and in particular, to a method and an apparatus for accessing a multimedia resource of a smart television and a smart television.

BACKGROUND

As an information terminal, a smart television not only may be used for searching for a television channel, recording a television program, and playing satellite and cable television programs, but also may use various application programs such as network search, IP television, video on demand, digital music, network news, and a network video phone by installing software.

In an existing smart television, selection directories are set for multimedia content provided for different television channels and different application programs. For example, in the smart television, an EPG (Electronic Program Guide, electronic program guide) is set for television channels, so that a user selects a television channel in the EPG, and an application service icon selection interface is set for application programs, where various application services are displayed on the application service icon selection interface of the television in a form of icons, so that the user reaches a required application service icon by pressing up, down, left and right keys of a remote controller, and then enters a corresponding application service by pressing an OK key. When accessing the smart television, the user may determine, according to a selection directory corresponding to the television channels or the application programs, multimedia content to be watched.

However, in the existing smart television access method, the user needs to select multimedia content in a corresponding selection directory. That is to say, the user selects a television channel on the EPG and selects an application program on the application service icon selection interface. If the user intends to use an application program when watching a television program, the application service icon selection interface needs to be switched to, and the user selects a corresponding application program that the user intends to select on the application service icon selection interface. In the existing smart television access method, especially when the user selects multimedia content without an objective, and, for example, when the user continuously changes the selection between a television channel and an application program, the television needs to continuously switch between the selection directories, so interaction efficiency of selecting the multimedia resource of the smart television becomes low.

SUMMARY

In view of this, the present invention provides a method and an apparatus for accessing a multimedia resource of a smart television and a smart television, which are used to solve a problem that an interaction process of selecting a multimedia resource of a smart television is complex.

In one aspect, a method for accessing a multimedia resource of a smart television is provided, where a technical solution is as follows:

receiving a channel selection signal to determine a target channel index number;

querying pre-bound correspondence between a channel index number and a multimedia resource;

when one multimedia resource corresponding to the target channel index number exists, starting the multimedia resource; and when multiple multimedia resources corresponding to the target channel index number exist, presenting all identifiers of the multimedia resources corresponding to the target index number, and determining a target multimedia resource according to a selection instruction of a user and starting the target multimedia resource, where the multimedia resource is a television channel or an application program.

In another aspect, an apparatus for accessing a multimedia resource of a smart television is provided, and includes a signal receiving unit, a querying unit, a starting unit, and a presenting unit, where the signal receiving unit is configured to receive a channel selection signal to determine a target index number;

the querying unit is configured to query pre-bound correspondence between a channel index number and a multimedia resource;

when one multimedia resource corresponding to the target index number exists, the starting unit starts the multimedia resource; and when multiple multimedia resources corresponding to the target index number exist, the presenting unit presents all identifiers of the multimedia resources corresponding to the target index number, and the starting unit determines a target multimedia resource according to a selection instruction of a user and starts the target multimedia resource, where the multimedia resource is a television channel or an application program.

In addition, a smart television is further provided, and includes the foregoing apparatus for accessing a multimedia resource of a smart television.

The foregoing technical solutions have the following beneficial effects:

It can be known from the foregoing technical solutions that, compared with the prior art, in the present invention, a channel index number is associated with a multimedia resource. When a channel index number is selected, a multimedia resource corresponding to the channel index number is queried for and the corresponding multimedia resource is output, where the multimedia resource is a television channel or an application program. In the method, after a smart television receives a selection instruction of a user, a multimedia resource corresponding to the selection instruction of the user can be directly switched to without the need of exiting a running user interface. The smart television does not need to switch between selection directories, thereby simplifying a process of selecting a multimedia resource and improving interaction efficiency of selecting the multimedia resource of the smart television.

In addition, in the present invention, multiple multimedia resources may correspond to one channel index number, thereby reducing the number of used channel index numbers.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description are merely embodiments of the present invention, and persons of ordinary skill in the art may further obtain other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
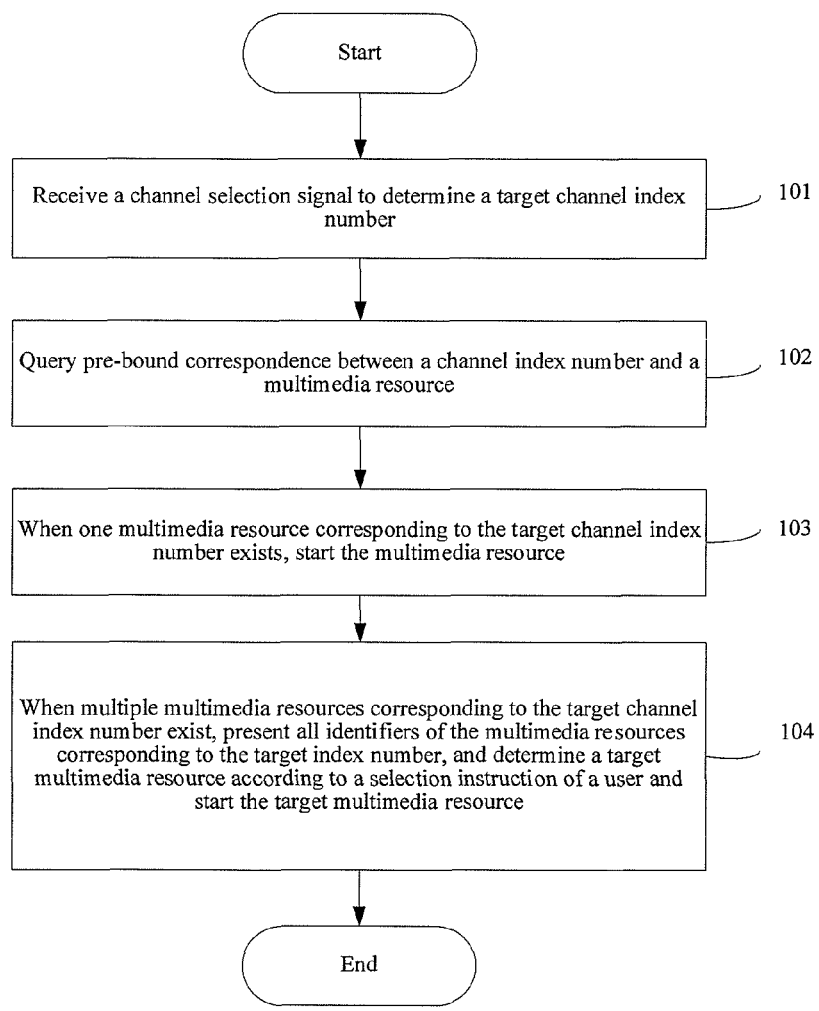
FIG. 1 is a flow chart of a method for selecting a multimedia resource of a smart television according to the present invention.

Referring to FIG. 1, FIG. 1 is a flow chart of a method for selecting a multimedia resource of a smart television according to the present invention, where the method may include the following steps:

Step 101: Receive a channel selection signal to determine a target channel index number.

The channel selection signal may be a signal on an EPG, and may also be a signal on a remote controller. A user may select a channel index number on a channel index number menu list provided by the EPG, and may also select a channel index number by pressing a key value of the remote controller. A smart television uses the received channel index number selected on the EPG or channel index number selected according to the key value of the remote controller as the target channel index number.

Step 102: Query pre-bound correspondence between a channel index number and a multimedia resource, where the multimedia resource is a television channel or an application program.

Before the correspondence between a channel index number and a multimedia resource is queried, it is required to bind the channel index number to the multimedia resource. Same as two cases of selecting the channel index number, a binding process may have the following two manners:

The first manner is: binding an application program to a channel index number in the EPG.

The second manner is: binding an application program to a specific key value of the remote controller.

Figure 2:
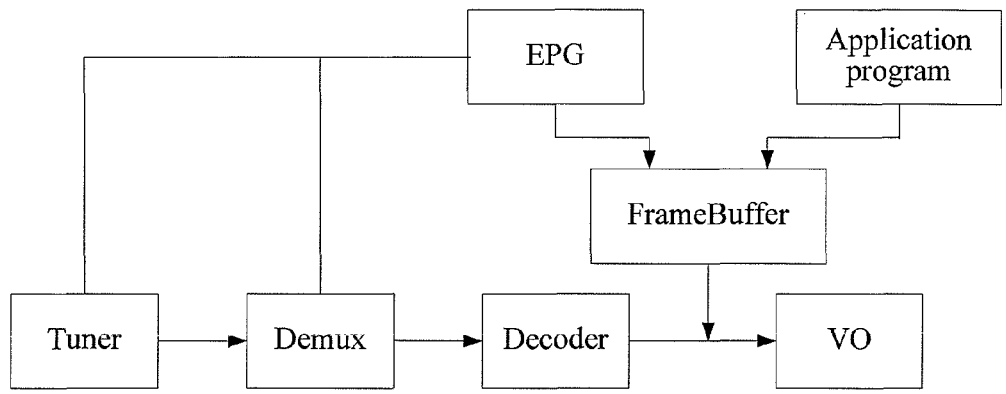
FIG. 2 is a design diagram of a television channel display according to the present invention.

For the first case:

Generally, a design of a television channel display may be shown in FIG. 2, where a digital television code stream is input through a channel tuner Tuner, a demultiplexer Demux divides a multiplexed digital television code stream into frequency points, and outputs the frequency points to different channels to generate an EPG (Electronic Program Guide, electronic program guide); the EPG is for a user to select a specific channel, and after receiving the selected channel, the EPG instructs the channel tuner Tuner and the demultiplexer Demux to demultiplex a corresponding digital television code stream; and a Decoder decodes the demultiplexed digital television code stream and outputs the decoded digital television code stream, where the digital television code stream is output to a video layer, but a UI (User Interface, user interface), such as the EPG and the application program, is output to a graph layer Framebuffer, and finally the video layer and the graph layer Framebuffer are superimposed and output to a screen through VO (Video Output, video output).

Figure 3:
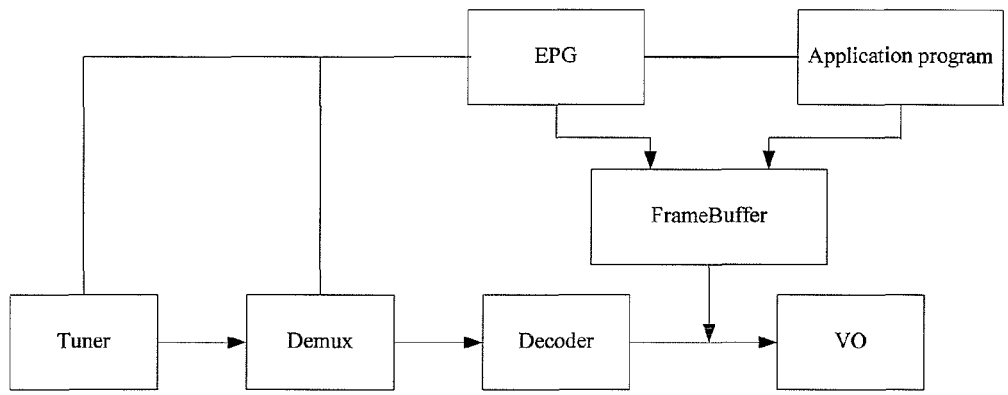
FIG. 3 is a schematic diagram of binding a channel index number in an EPG to an application program according to the present invention.

In this embodiment, the application program may be bound to the channel index number in the EPG. As shown in FIG. 3, specifically, the channel index number in the EPG may be associated with information of the application program (for example, a package name package name). For example, in an Android system, the channel index number in the EPG is associated with a package name of the application program, that is, the following mapping relationship exists: index→package name. When the user selects a channel index number on the EPG through the remote controller, the television finds information of an application program according to the mapping relationship, and then activates the application program by invoking a specific command. For example, in the Android system, a corresponding application program may be activated by sending intent including a package name. If the application program is activated, an application interface of the application program is also output to the graph layer Framebuffer and output through the VO.

Figure 4:
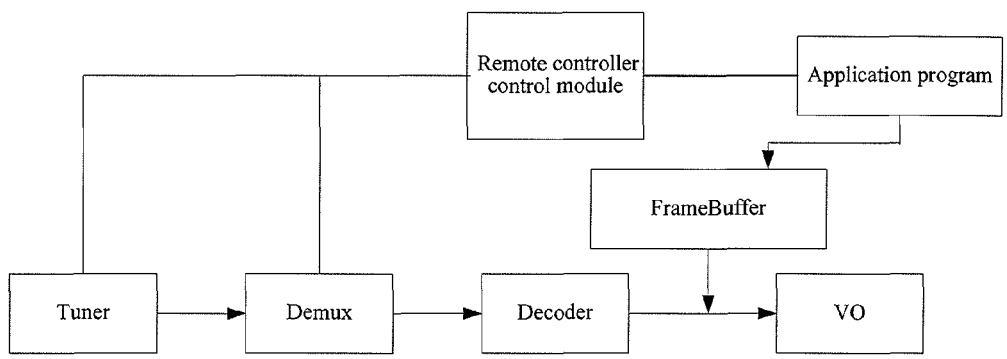
FIG. 4 is a schematic diagram of binding a key value of a remote controller to an application program according to the present invention.

For the second case: Referring to FIG. 4, specifically, a remote controller control module may be further added to bind a specific key value of the remote controller to a specific application program. After the binding, if the user uses the remote controller to input a certain key value, the remote controller control module obtains the key value. It should be noted that, the remote controller may be a remote controller of a common television set, and may also be other devices having a remote control function, such as a mobile phone and a tablet computer. Correspondingly, the remote controller control module is a control module corresponding to the remote controller. For example, when the remote controller is a mobile phone, the remote controller control module is a mobile phone control module, and the mobile phone control module may obtain a key value sent by the mobile phone.

Step 103: When one multimedia resource corresponding to the target channel index number exists, start the multimedia resource.

The smart television receives the target channel index number selected by the user on the EPG. If one multimedia resource corresponding to the target channel index number exists, that is, the multimedia resource corresponds to one television channel or one application program, the television channel or the application program is started directly. That is to say, if one multimedia resource corresponding to the channel index number exists, when the user selects the channel index number, an objective of the user is to select to watch a television program corresponding to the channel index number or use the application program corresponding to the channel index number, so the smart television starts the television channel or the application program directly.

Step 104: When multiple multimedia resources corresponding to the target channel index number exist, present all identifiers of the multimedia resources corresponding to the target index number, and determine a target multimedia resource according to a selection instruction of the user and start the target multimedia resource.

The user selects a channel index number on the channel index number menu list provided by the EPG. When multiple multimedia resources corresponding to the selected channel index number exist, that is, when the multimedia resources correspond to multiple television channels, or multiple application programs, or at least one television channel and at least one application program, all identifiers of the multimedia resources corresponding to the channel index number are presented, and the user selects an identifier of a corresponding multimedia resource. The smart television determines a target multimedia resource according to the selection instruction of the user and starts the target multimedia resource. If the user selects an application program icon, the EPG stops outputting of the Tuner, that is, a television program is not output and a corresponding application program is instructed to be activated. When another interface is switched to, a current application program is closed.

The user selects a channel index number by pressing a key value of the remote controller on the remote controller, and the remote controller control module obtains the key value. When multiple multimedia resources corresponding to the selected channel index number exist, that is, when the multimedia resources correspond to multiple television channels, or multiple application programs, or at least one television channel and at least one application program, all identifiers of the multimedia resources corresponding to the channel index number are presented, and the user selects an identifier of a corresponding multimedia resource. The smart television determines a target multimedia resource according to the selection instruction of the user and starts the target multimedia resource. If the user selects an application program icon, the remote controller control module stops outputting of the tuner Tuner, that is, a television program is not output and a corresponding application program is instructed to be activated. When another key value is input, a current program is closed.

In the present invention, a channel index number is associated with a multimedia resource. When a channel index number is selected, a multimedia resource corresponding to the channel index number is queried for and the corresponding multimedia resource is output, where the multimedia resource is a television channel or an application program. In the method, after a smart television receives a selection instruction of a user, a multimedia resource corresponding to the selection instruction of the user can be directly switched to without the need of exiting a running user interface. The smart television does not need to switch between selection directories, thereby simplifying a process of selecting a multimedia resource and improving interaction efficiency of selecting the multimedia resource of the smart television.

In addition, in the present invention, multiple multimedia resources may correspond to one channel index number, thereby reducing the number of used channel index numbers.

Figure 5A:
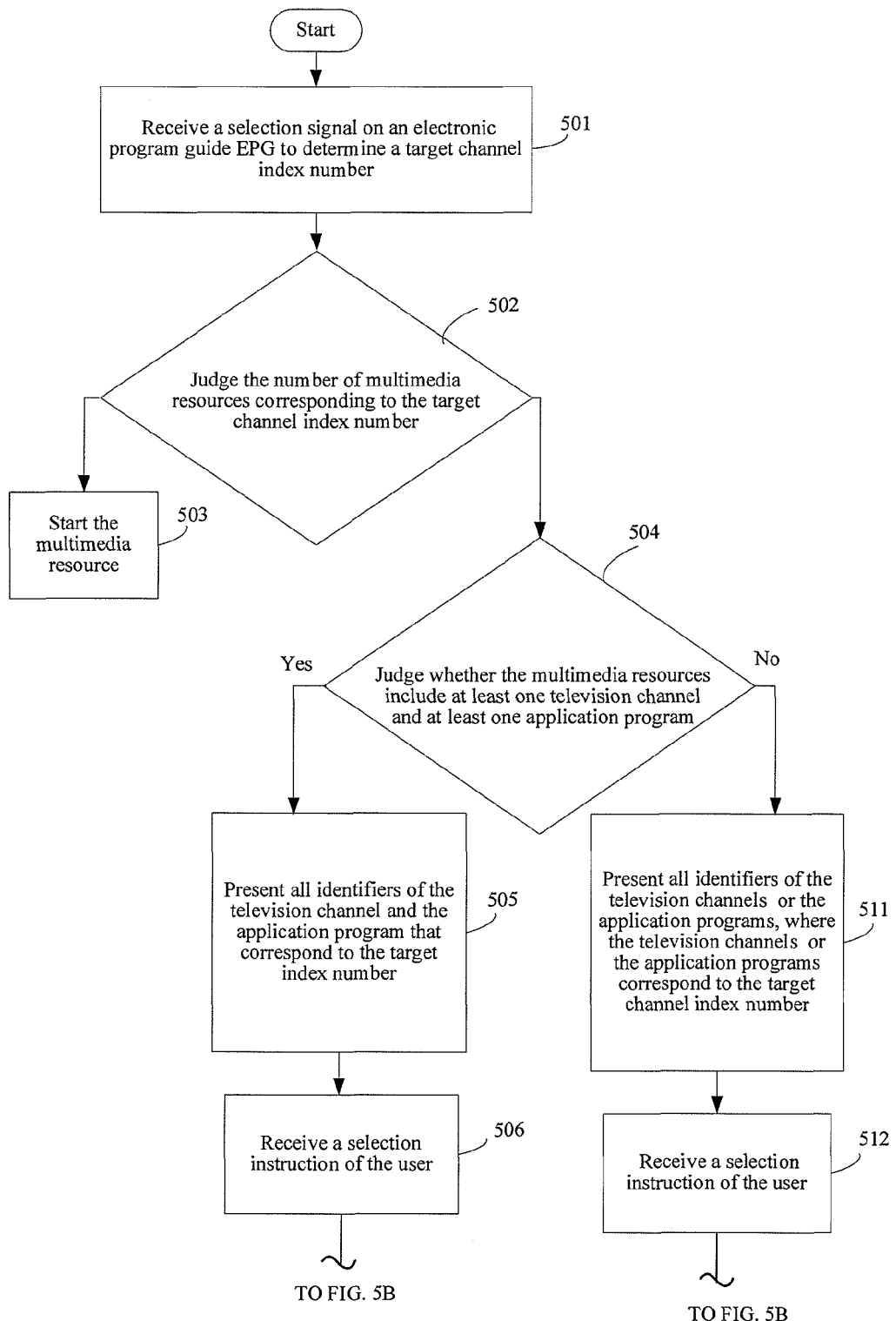
FIG. 5A and FIG. 5B are another flow chart of a method for selecting an application service program of a smart television according to the present invention.
Figure 5B:
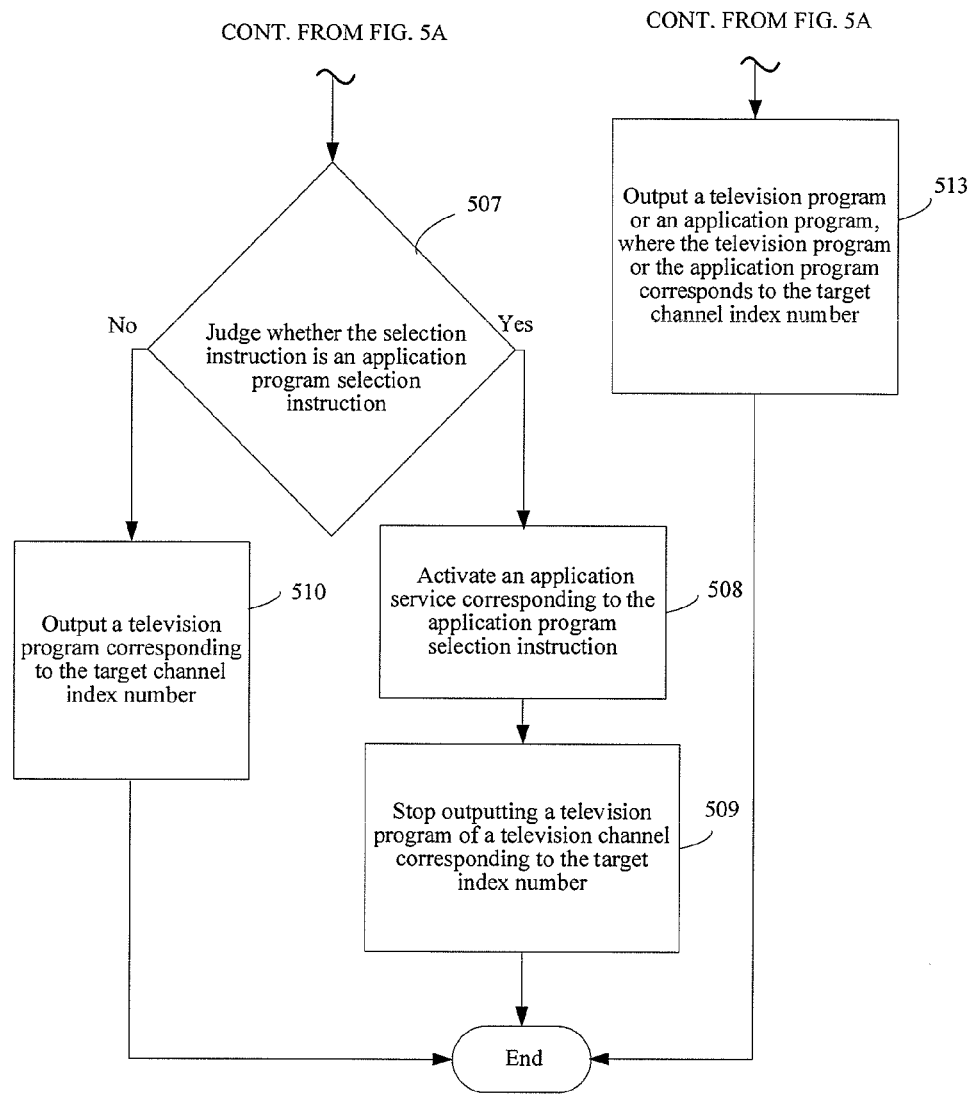

Furthermore, referring to FIG. 5A and FIG. 5B, FIG. 5A and FIG. 5B are another flow chart of a method for selecting an application service program of a smart television according to the present invention, where the method may include the following steps:

Step 501: Receive a selection signal on an electronic program guide EPG to determine a target channel index number.

A user selects a channel index number on the EPG, for example, a channel 111, and the smart television uses the received channel 111 as the target channel index number.

In addition, a manner for determining the target channel index number may further be: receiving a key value selection signal of a remote controller to determine the target index number.

Step 502: Judge the number of multimedia resources corresponding to the target channel index number, when one multimedia resource exists, enter step 503, and when multiple multimedia resources corresponding to the target index number exist, enter step 504.

One or multiple multimedia resources corresponding to the target channel index number may exist. When one multimedia resource corresponding to the target channel index number exists, that is, the multimedia resource corresponds to one television channel or one application program, enter step 503.

When multiple multimedia resources corresponding to the target channel index number exist, that is, the multimedia resources correspond to multiple television channels, or multiple application programs, or at least one television channel and at least one application program, enter step 504.

The channel 111 is still taken as an example. The channel 111 may correspond to the following several cases: one television channel, multiple television channels, one application program, multiple application programs, or at least one television channel and at least one application program. If the channel 111 corresponds to one television channel or one application program, enter step 503, and in other cases, enter step 504.

Step 503: Start the multimedia resource.

When the channel 111 corresponds to one television channel or one application program, a television program of the television channel or the application program is started directly.

Step 504: Judge whether the multimedia resources include at least one television channel and at least one application program, when the multimedia resources corresponding to the target index number are at least one television channel and at least one application program, enter step 505 to step 507, and otherwise, enter step 511 to step 513.

Step 505: Present all identifiers of the television channel and the application program that correspond to the target index number.

When the multimedia resources corresponding to the target channel index number are at least one television channel and at least one application program, all identifiers of the television channel and the application program that correspond to the target channel index number are presented on a television screen for the user to select. If the user selects a television channel identifier, a corresponding television channel is activated, and a television program corresponding to the television channel is output. If the user selects an application program identifier, a corresponding application program is activated, and an application interface of the application program is jumped to.

Assuming that the channel 111 corresponds to a television channel 111, where the television channel 111 outputs a television program of the television channel 111, and meanwhile, the channel 111 further corresponds to a cloud photo album application program, so the smart television displays a television channel identifier of the television channel 111 and a cloud photo album application program identifier at the same time for the user to select.

Step 506: Receive a selection instruction of the user.

It is assumed that the user selects the cloud photo album application program identifier.

Step 507: Judge whether the selection instruction is an application program selection instruction, if yes, enter step 508 to step 509, and otherwise, enter step 510.

Because the user selects the cloud photo album application program identifier, enter step 508 to step 509.

Step 508: Activate an application service corresponding to the application program selection instruction.

Step 509: Stop outputting a television program of a television channel corresponding to the target index number.

The cloud photo album application program is activated, and outputting of the television program corresponding to the television channel 111 is stopped.

Step 510: Output a television program corresponding to the target channel index number.

Step 511: Present all identifiers of the television channels or the application programs, where the television channels or the application programs correspond to the target channel index number.

Step 512: Receive a selection instruction of the user.

Step 513: Output a television program or an application program, where the television program or the application program corresponds to the target channel index number.

In the present invention, a channel index number is associated with a multimedia resource. When a channel index number is selected, a multimedia resource corresponding to the channel index number is queried for and the corresponding multimedia resource is output, where the multimedia resource is a television channel or an application program. In the method, when a smart television receives a selection instruction of a user, a multimedia resource corresponding to the selection instruction of the user can be directly switched to without the need of exiting a running user interface. The smart television does not need to switch between selection directories, thereby simplifying a process of selecting a multimedia resource and improving interaction efficiency of selecting the multimedia resource of the smart television.

In addition, in the present invention, multiple multimedia resources may correspond to one channel index number, thereby reducing the number of used channel index numbers.

Figure 6:
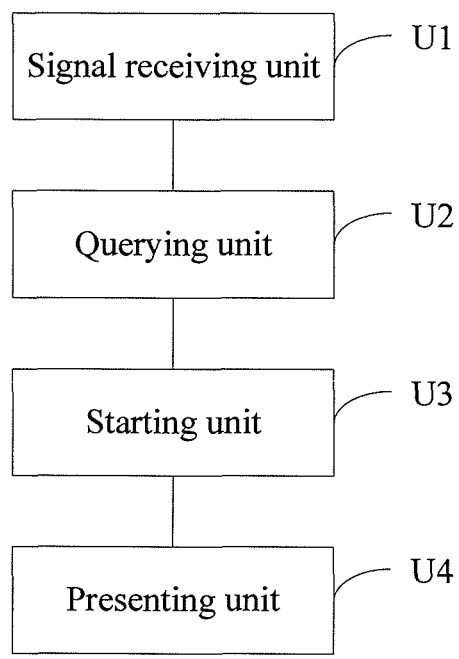
FIG. 6 is a schematic structural diagram of an apparatus for accessing a multimedia resource of a smart television according to the present invention.

Corresponding to the method provided by the method for accessing a multimedia resource of a smart television in the foregoing present application, referring to FIG. 6, the present invention further provides a schematic structural diagram of an apparatus for accessing a multimedia resource of a smart television, where the apparatus may include:

a signal receiving unit U1, a querying unit U2, a starting unit U3 and a presenting unit U4, where the signal receiving unit U1 is configured to receive a channel selection signal to determine a target index number;

the querying unit U2 is configured to query pre-bound correspondence between a channel index number and a multimedia resource;

when one multimedia resource corresponding to the target index number exists, the starting unit U3 starts the multimedia resource; and when multiple multimedia resources corresponding to the target index number exist, the presenting unit U4 presents all identifiers of the multimedia resources corresponding to the target index number, and the starting unit U3 determines a target multimedia resource according to a selection instruction of a user and starts the target multimedia resource, where the multimedia resource is a television channel or an application program.

The receiving, by the signal receiving unit U1, the channel selection signal to determine the target index number may be:

receiving, by the signal receiving unit U1, a selection signal on an electronic program guide EPG to determine a target index number.

The receiving, by the signal receiving unit, the channel selection signal to determine the target index number may be:

receiving, by the signal receiving unit U1, a key value selection signal of a remote controller to determine a target index number.

Figure 7:
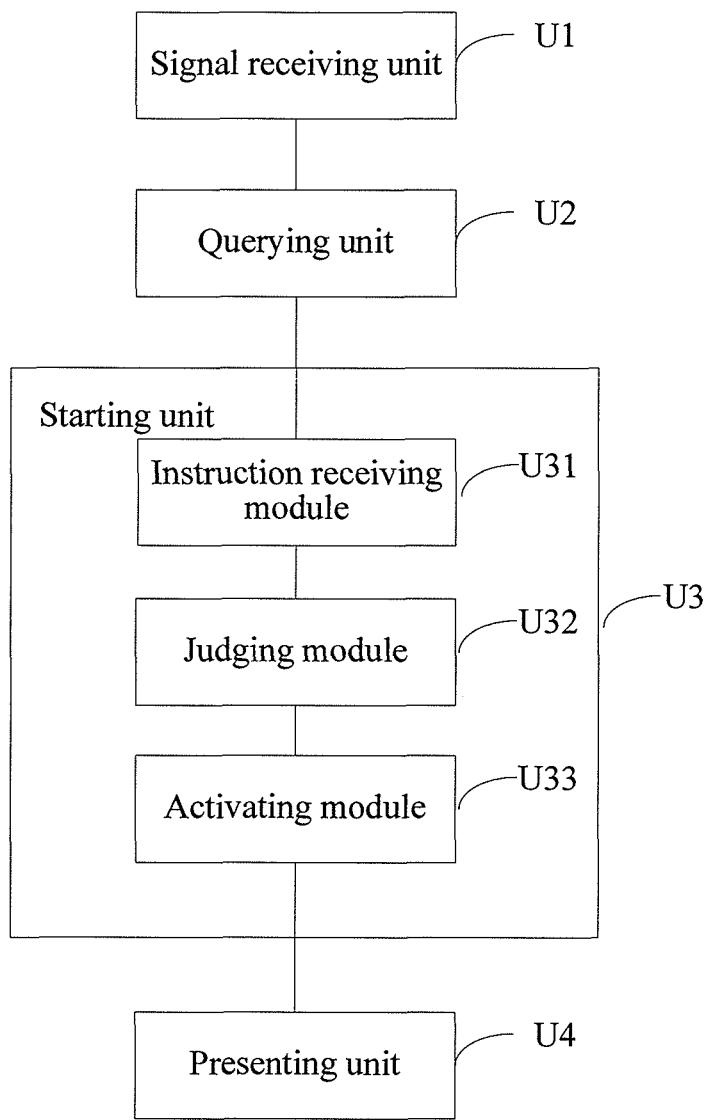
FIG. 7 is another schematic structural diagram of an apparatus for accessing a multimedia resource of a smart television according to the present invention.

Referring to FIG. 7, the starting unit U3 may include an instruction receiving module U31, a judging module U32, and an activating module U33, where when the multiple multimedia resources corresponding to the target index number exist, the presenting, by the presenting unit U4, all the identifiers of the multimedia resources corresponding to the target index number and the determining, by the starting unit U3, the target multimedia resource according to the selection instruction of the user and starting the target multimedia resource specifically include:

when the multimedia resources corresponding to the target index number are at least one television channel and at least one application program, presenting, by the presenting unit U4, all identifiers of the television channel and the application program that correspond to the target index number;

receiving, by the instruction receiving module U31, a selection instruction of the user; and judging, by the judging module U32, whether the selection instruction is an application program selection instruction, and if yes, activating, by the activating module U33, an application service corresponding to the application program selection instruction.

Figure 8:
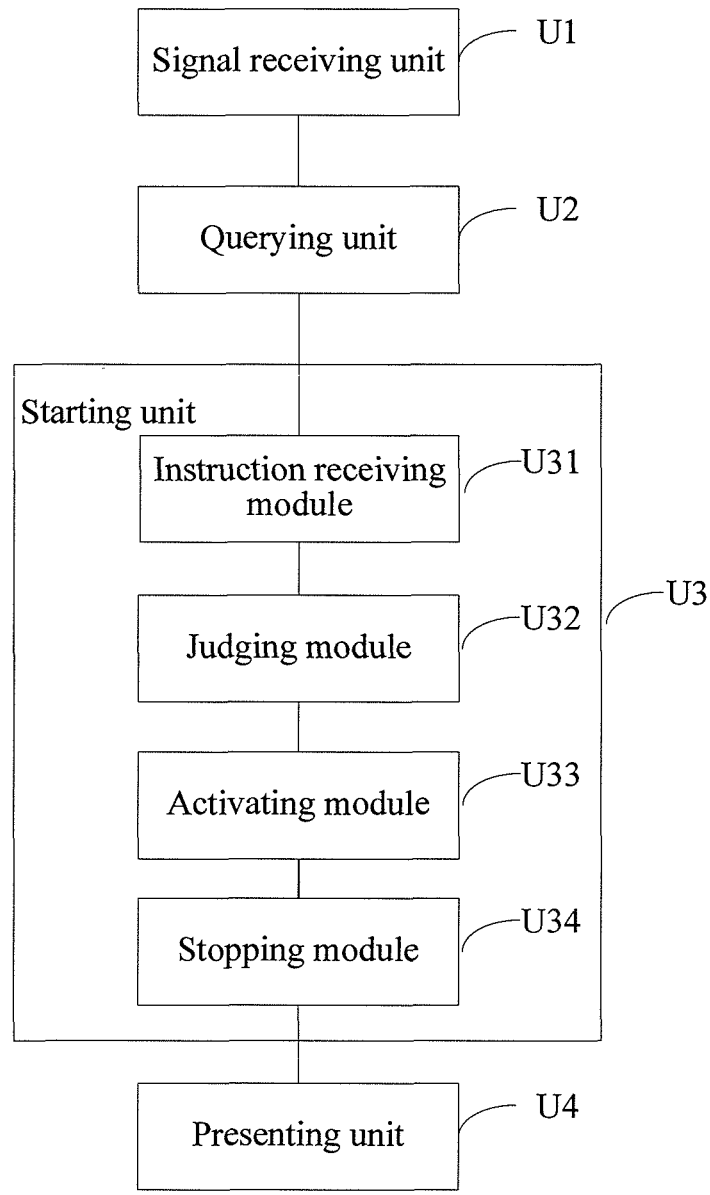
FIG. 8 is another schematic structural diagram of an apparatus for accessing a multimedia resource of a smart television according to the present invention.

Referring to FIG. 8, the starting unit U3 may further include a stopping module U34, where the stopping module U34 is configured to, after the application service corresponding to the application program selection instruction is activated, stop outputting television programs of television channels corresponding to all identifiers of television channels corresponding to the target index number.

It can be known from the foregoing technical solutions that, compared with the prior art, in the present invention, a channel index number is associated with a multimedia resource. When a channel index number is selected, the signal receiving unit U1 receives a channel selection signal to determine a target index number, the querying unit U2 queries a multimedia resource corresponding to the channel index number, and when one multimedia resource corresponding to the target index number exists, the starting unit U3 starts the multimedia resource.

When multiple multimedia resources corresponding to the target index number exist, the presenting unit U4 presents all identifiers of the multimedia resources corresponding to the target index number, and the starting unit U3 determines a target multimedia resource according to a selection instruction of a user and starts the target multimedia resource, where the multimedia resource is a television channel or an application program. With the apparatus, when the smart television receives the selection instruction of the user, the multimedia resource corresponding to the selection instruction of the user can be directly switched to without the need of exiting a running user interface. The smart television does not need to switch between selection directories, thereby simplifying a process of selecting a multimedia resource and improving interaction efficiency of selecting the multimedia resource of the smart television.

In addition, in the present invention, multiple multimedia resources may correspond to one channel index number, thereby reducing the number of used channel index numbers.

Furthermore, the present application further provides a smart television, including the foregoing apparatus for accessing a multimedia resource of a smart television. Because the smart television has the apparatus for accessing a multimedia resource of a smart television in the foregoing embodiment, the smart television has beneficial effects of the foregoing apparatus for accessing a multimedia resource of a smart television, which are not repeatedly described here.

Through the description of the foregoing method embodiments, persons skilled in the art may clearly understand that the present invention may be implemented by means of software and a necessary general hardware platform, and certainly may also be implemented by means of hardware, but the former is a preferred implementation manner in many cases. Based on such understanding, the technical solutions of the present invention essentially, or the part contributing to the prior art may be implemented in a form of a software product. The computer software product is stored in a storage medium, and includes several instructions for instructing a computer device (which may be a personal computer, a server, a network device, or the like) to perform all or part of the steps of the methods in the embodiments of the present invention. The storage medium includes: any medium that is capable of storing program codes, such as a read-only memory (ROM), a random access memory (RAM), a magnetic disk, or an optical disk.

Because the apparatus embodiments basically correspond to the method embodiments, for related parts, reference may be made to part of the description in the method embodiments. The apparatus embodiments described in the foregoing are merely exemplary, where the units described as separate parts may or may not be physically separate, and parts shown as units may or may not be physical units, may be located in one position, or may be distributed on multiple network units. Part or all of the modules may be selected according to actual needs to achieve objectives of the solutions of the embodiments. Persons of ordinary skill in the art may understand and implement the embodiments without creative efforts.

In the several embodiments provided in the present application, it should be understood that the disclosed apparatus and method may be implemented in other manners without departing from the spirit and scope of the present application. The current embodiments are merely exemplary examples, and should not be regarded as a limitation, and the detailed content should not limit the objective of the present application. For example, dividing of units or subunits is merely a kind of logic function dividing, and there may be other dividing manners during actual implementation. For example, multiple units or multiple subunits are combined together. In addition, multiple units or components may be combined or integrated into a peer apparatus, or some features may be ignored or not executed.

In addition, the described apparatus and method and schematic diagrams of different embodiments may be combined or integrated with other apparatuses, modules, technologies or methods without departing from the scope of the present application.

The foregoing descriptions are merely specific embodiments of the present invention. It should be noted that persons skilled in the art may further make several modifications and variations without departing from the principle of the present invention, and these modifications and variations should also be construed as falling within the protection scope of the present invention.

What is claimed is:

1. A method for accessing a multimedia resource of a smart television, comprising:
    receiving a channel selection signal to determine a target channel index number;
    querying pre-bound correspondence between a channel index number and a multimedia resource; and
    when multiple multimedia resources corresponding to the target channel index number exist, presenting all identifiers of the multimedia resources corresponding to the target index number, determining a target multimedia resource according to a selection instruction of a user and, when the target multimedia resource is determined to be an application program, starting the application program without exiting a running user interface, wherein
    the multiple multimedia resources comprise a television channel and an application program.

2. The method according to claim 1, wherein receiving the channel selection signal to determine the target index number comprises:
    receiving a selection signal on an electronic program guide EPG to determine a target index number.

3. The method according to claim 1, wherein receiving the channel selection signal to determine the target index number comprises:
    receiving a key value selection signal of a remote controller to determine a target index number.

4. The method according to claim 2, further comprising:
    judging whether the selection instruction is an application program selection instruction, and if yes, activating an application service corresponding to the application program selection instruction.

5. The method according to claim 4, further comprising:
    stopping outputting television programs of television channels corresponding to all identifiers of television channels corresponding to the target index number.

6. An apparatus for accessing a multimedia resource of a smart television, comprising a signal receiving unit, a querying unit, a starting unit, and a presenting unit, wherein
    the signal receiving unit is configured to receive a channel selection signal to determine a target index number;
    the querying unit is configured to query pre-bound correspondence between a channel index number and a multimedia resource; and
    when multiple multimedia resources corresponding to the target index number exist, the presenting unit presents all identifiers of the multimedia resources corresponding to the target index number, the starting unit determines a target multimedia resource according to a selection instruction of a user and, when the target multimedia resource is determined to be an application program, the starting unit starts the application program without exiting a running user interface, wherein
    the multiple multimedia resources comprise a television channel and an application program.

7. The apparatus according to claim 6, wherein the signal receiving unit is configured to receive the channel selection signal on an electronic program guide EPG to determine the target index number.

8. The apparatus according to claim 6, wherein the signal receiving unit is configured to receive a key value selection signal of a remote controller to determine the target index number.

9. The apparatus according to claim 7, wherein the starting unit comprises an instruction receiving module, a judging module, and an activating module, wherein
- the instruction receiving module is configured to receive the selection instruction of the user; and
- the judging module is configured to judge whether the selection instruction is an application program selection instruction, and if yes,
- the activating module is configured to activate an application service corresponding to the application program selection instruction.

10. The apparatus according to claim 9, wherein the starting unit further comprises a stopping module, wherein
- the stopping module is configured to, after the activating module activates the application service corresponding to the application program selection instruction, stop outputting television programs of television channels corresponding to all identifiers of television channels corresponding to the target index number.

* * * * *